United States Patent
Pavlyushchik et al.

(10) Patent No.: US 8,646,084 B1
(45) Date of Patent: Feb. 4, 2014

(54) SECURING FILE LAUNCH ACTIVITY UTILIZING SAFETY RATINGS

(71) Applicant: Kaspersky Lab ZAO, Moscow (RU)

(72) Inventors: Mikhail A. Pavlyushchik, Moscow (RU); Alexey V. Monastyrsky, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

(21) Appl. No.: 13/720,311

(22) Filed: Dec. 19, 2012

(30) Foreign Application Priority Data

Sep. 28, 2012 (RU) ................. 2012141466

(51) Int. Cl.
*H04L 29/06* (2006.01)
(52) U.S. Cl.
USPC .......................................................... 726/24
(58) Field of Classification Search
None
See application file for complete search history.

(56) References Cited

U.S. PATENT DOCUMENTS

| | | | |
|---|---|---|---|
| 7,467,409 B2 | 12/2008 | Reasor et al. | |
| 7,530,106 B1 * | 5/2009 | Zaitsev et al. | 726/24 |
| RE43,529 E | 7/2012 | Rozman et al. | |
| 2005/0015482 A1 | 1/2005 | Blankenship | |
| 2005/0268112 A1 | 12/2005 | Wang et al. | |
| 2009/0064329 A1 | 3/2009 | Okumura et al. | |
| 2009/0282476 A1 * | 11/2009 | Nachenberg et al. | 726/22 |
| 2010/0058468 A1 * | 3/2010 | Green et al. | 726/22 |
| 2011/0154490 A1 | 6/2011 | DeLuca et al. | |
| 2012/0036569 A1 | 2/2012 | Cottrell et al. | |
| 2012/0192275 A1 * | 7/2012 | Oliver et al. | 726/24 |

OTHER PUBLICATIONS

Description of how the Attachment Manager works in Microsoft Windows. http://support.microsoft.com/kb/883260. 5 pages. May 24, 2011.
Brown, IT Security. Chapter 10 Malicious Software. 37 pages. Oct. 6, 2010. PowerPoint Presentation.

* cited by examiner

*Primary Examiner* — David Pearson
(74) *Attorney, Agent, or Firm* — Patterson Thuente Pedersen, PA

(57) ABSTRACT

System and method for assessing a risk level associated with launching acquired objects on an associated computer system. Events occurring on the computer system are detected, including an event representing launching of a first object. An association of a detected launching of the first object with user input effecting that launching, if any, is stored. In response to a launching of the first object, a determination is made as to whether an association exists between the launching, and any user input initiating that launching. A risk assessment record is updated for the first object such that, in response to the launching of the first object being either associated or not associated with user input initiating that launching, the risk assessment record is updated to reduce an indicated risk level for the first object, or to increase the indicated risk level for the first object, respectively.

30 Claims, 5 Drawing Sheets

US 8,646,084 B1

SECURING FILE LAUNCH ACTIVITY UTILIZING SAFETY RATINGS

PRIOR APPLICATION

This Application claims the benefit of Russian Federation Patent Application No. 2012141466 filed Sep. 28, 2012, incorporated by reference herein.

FIELD OF THE INVENTION

The invention relates generally to information processing and security and, more particularly, to assessing a risk level associated with launching acquired objects, such as downloaded files.

BACKGROUND OF THE INVENTION

In the world of mass use of computer devices, such as desktop and portable personal computers and smartphones, tablets, and other mobile devices, various types of computer threats have become widespread. Examples of computer threats are network worms, Trojan programs and computer viruses.

One of the most effective methods for countering computer threats is the use of antivirus software—a software package designed for removing malicious (or potentially malicious) objects from the operating system of a computer device. As methods for detecting malicious objects, antivirus programs use various approaches, for example, an analysis using a database of signatures of known malicious objects, and a heuristic analysis, which determines the malicious nature of an object with a certain degree of probability by a number of characteristics and rules. One of the traits of malicious objects is their spontaneous launch in a computer system (without the user's knowledge). Often, such a launch follows an automatic (not requiring confirmation from a user) download of a malicious object from an internet site visited by the user. This method of launching a malicious object is known in the art as a "drive-by download".

There are many known solutions designed for monitoring the events in the operating system in order to analyze the objects attempting to launch themselves for potentially malicious purposes.

For example, U.S. Pat. No. 7,467,409 describes a system designed for determining the safety of files sent to a computer device using client programs, such as e-mail clients, instant messaging programs or browsers. The system's operation is based on the use of an interface common for all clients, which, in order to check the received files, can call for programs designed to provide computer security (for example, antivirus applications).

The above mentioned approach is realized in the Attachment Manager technology—a tool built in the Windows operating system (starting from the XP SP2 version), designed for protection against unsafe files downloaded from the Internet and against unsafe attachments in received e-mail messages. If the Attachment Manager determines that the attachment file is not safe, it can prevent the opening of the file or warn the user before the file is opened. The file's safety is determined based on the following criteria: the file's type, the type of the application being used, and the security settings for the network area from which the file was downloaded. In addition, the Attachment Manager tool's settings allow to activate the possibility of notifying the registered antivirus application on the files opened by the user, in order to check them. The Attachment Manager tool is used by all the applications of the Microsoft Office package and most browsers.

However, the use of the above-mentioned solution causes an inevitable delay when the file is launched, due to the fact that the call for the antivirus application and the subsequent check require some time.

A new solution is needed to effectively prevent malicious activity in downloaded files without the accompanying delay associated with conventional security solutions.

SUMMARY OF THE INVENTION

One aspect of the invention is directed to a security arrangement for assessing a risk level associated with launching acquired objects in an associated computer system. The security arrangement comprises computing hardware, including a processor, a data store, input/output facilities, and a user interface, and an operating system executable on the computing hardware, and adapted to facilitate launching of objects in the computer system. Also included is an event monitoring module executable on the computing hardware and operatively coupled with the operating system, the event monitoring module configured to detect events occurring on the computer system including an event representing launching of a first object. A launch registration module is executable on the computing hardware and operatively coupled with the event monitoring module, the launch registration module configured to store an association of a detected launching of the first object with user input effecting that launching, if any.

A comparison module operatively coupled with the event monitoring module and the launch registration module. The comparison module is configured to determine, in response to a launching of the first object, whether an association exists between the launching, and any user input initiating that launching. The comparison module is further adapted to maintain a risk assessment record for the first object such that: in response to the launching of the first object being associated with user input initiating that launching, the risk assessment record is updated to reduce an indicated risk level for the first object; and in response to the launching of the first object not being associated with any user input initiating that launching, the risk assessment record is updated to increase the indicated risk level for the first object.

In a related aspect of the invention, a method includes detecting events occurring on the computer system including an event representing launching of a first object; storing an association of a detected launching of the first object with user input effecting that launching, if any; and determining, in response to a launching of the first object, whether an association exists between the launching, and any user input initiating that launching. Moreover, a risk assessment record for the first object is updated such that, in response to the launching of the first object being associated with user input initiating that launching, the risk assessment record is updated to reduce an indicated risk level for the first object; and in response to the launching of the first object not being associated with any user input initiating that launching, the risk assessment record is updated to increase the indicated risk level for the first object.

BRIEF DESCRIPTION OF THE DRAWINGS

The invention may be more completely understood in consideration of the following detailed description of various embodiments of the invention in connection with the accompanying drawings, in which.

Figure 1:
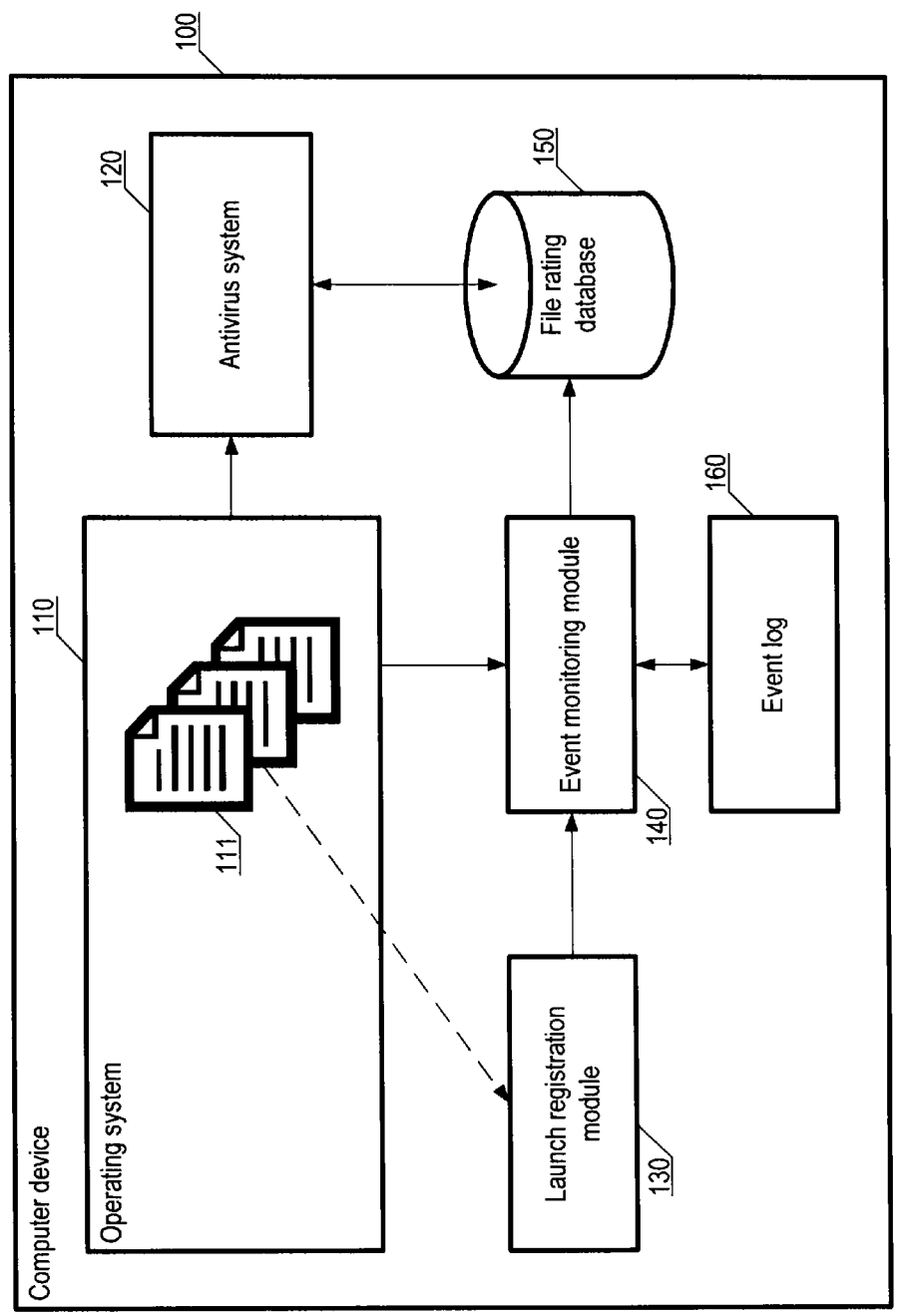
FIG. 1 is a block diagram illustrating a file safety rating determination system according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIG. 1 is a block diagram illustrating a file safety rating determination system according to one embodiment of the invention. An operating system 110 installed on a computer device 100 contains files 111. An antivirus system 120 analyzes the operating system 110 in order to find malicious files. An antivirus system in the present context is a computer security system that has various operational modules. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

The various modules of the antivirus security application, depending on their specialization, are designed for checking files for malicious objects, network traffic filtration, analysis of program processes, filtration of mail messages, protection against unauthorized access, prevention of intrusions, detection of anomalies in the network, etc. This variety of the protection tools being deployed is largely a reaction to the constant growth of malicious programs, attacks on corporate computer networks and the emergence of new types of threats directed at new network resources. Colloquially, the various tools of security applications are referred to collectively as an antivirus. Accordingly, the term antivirus as used herein is intended to refer primarily to the detection and removal of malware, but also is intended to refer more broadly to other security tools, if not inconsistent with the immediate context.

The detection of malicious files by the antivirus system 120 can be performed, for example, using a signature or heuristic analysis. One of the characteristics upon which the antivirus system determines whether a file is malicious or safe can be the file's safety rating, which is stored in the file rating database 150. A sample approach to the safety rating calculation is described in U.S. Pat. No. 7,530,106, the disclosure of which is incorporated by reference herein. Beside the safety rating of a specific file, the database 150 can contain a relevant identifier, which precisely identifies the file. An example of such identifier can be the file's hash sum. Another example of such identifier can be the file's full filename, i.e., the directory path and its filename in the operating system's file system. The safety rating itself can be expressed numerically (i.e., as a set value), or by file safety category values. Examples of such category values can be: "malicious", "suspicious", "unknown" and "safe". Respectively, the antivirus system 120, when analyzing files 111 of the operating system 110, qualifies a file as belonging to a certain category either based on the file category value with a relevant identifier in the database 150, or based on the comparison of the file rating's numeric value with a preset threshold.

The event monitoring module 140 is installed so as to monitor all events in the operating system 110. Examples of such events can be launch, creation or modification of files 111, as well as other events happening in the operating system 110. The event monitoring module 140 writes the information on all events which happened in the operating system 110 to the event log 160. An example of the information stored in the event log 160 can be a unique event object identifier (for example, the hash sum of a certain file 111), an event type (for example, the launch of the file 111) and the time of the event.

As it was noted above, one of the characteristics typical for malicious files is an independent (without the user's knowledge) launch in the operating system 110. The launch registration module 130 is designed for registering the launches of files 111 initiated by the user. The launch registration module 130, in one embodiment, can be represented by an Attachment Manager tool, built into the Windows operating system, as described above. In this embodiment, the launch registration module 130 will register the user-initiated launches of files 111, transmitted to the computer device 100 using client programs, such as e-mail clients, instant messaging programs or browsers. In a related embodiment, launch registration module is implemented as a separate component from the operating system. For instance, launch registration module 130 can be a function of antivirus system 120. Launch registration module 130 can be realized as a list, array, database, or other suitable one or more data structures and associated operational logic to be executed by the computer system.

The launch registration module 130 transmits the information on each registered launch of a file 111 to the event monitoring module 140. This information can contain a unique identifier of the file the launch of which was registered (for example, the hash sum), as well as the time of the registered launch. For the launch of each file 111, the event monitoring module 140 performs a check whether the launch registration module 130 has sent the information that the launch of the file had been registered. The check can be performed either by the fact of launch of any of the files 111 in the operating system 110, or periodically, upon expiry of a preset time period, based on the comparison of the information stored in the event log 160 and the information received from the launch registration module 130. The comparison can be performed, for example, by comparing unique identifiers of the files 111 stored in the event log 160 and contained in the information received from the launch registration module 130. If the check shows that the launch of a certain file 111 is not registered by the launch registration module 130, the event monitoring tool 140 can lower the confidence rating of the file in the file rating database 150. On the contrary, if the check shows that the launch of a certain file was registered by the launch registration module 130, the event monitoring module 140 can raise the file's confidence rating in the file rating database 150.

If the information on any launched files 111 is absent in the database 150, the event monitoring module 140 can assign a higher or lower rating for the file, compared to the default preset rating.

In a related embodiment, all the above-described functions of the event monitoring module 140 can be performed by the antivirus system 120 itself. In this case, the antivirus system 120 monitors all events in the operating system 110, including the launch of files 111. The launch registration module 130 sends the information on each registered launch of a file to the antivirus system 120. For the launch of each file 111, the antivirus system 120 checks whether information was received from the launch registration module 130 that the launch of the file was registered. Depending on the results of the check, the antivirus system 120 changes the file's safety rating value in the file rating database 150.

The file safety rating in the database 150 can be changed by a preset value, if the rating is expressed by an absolute number value, or another file safety category can be assigned.

For example, assuming that the file safety rating is expressed by a numeric value, and that the maximum rating value is one hundred units and the default value is fifty units. This means that a file with a safety rating value of one hundred units will be unconditionally considered as safe, while a file with a zero safety rating value will be unconditionally considered as malicious. For the files the launch of which is not registered, the event monitoring module 140 can lower the rating by twenty units. For the files the launch of which is registered, the event monitoring module 140 can raise the rating by twenty units. If the database 150 does not contain information on a file the launch of which is not registered, the event monitoring module 140 can initially assign a zero safety rating for the file. In this case, the launch of the file will be blocked by the antivirus system 120, because the file will be considered as malicious. In another case, if the database 150 does not contain information on a file the launch of which was registered, the event monitoring module 140 can initially assign a safety rating value of one hundred units for the file. In this case, the antivirus system 120 does not have to perform a further check of the file, as the file will be considered safe.

Figure 2:
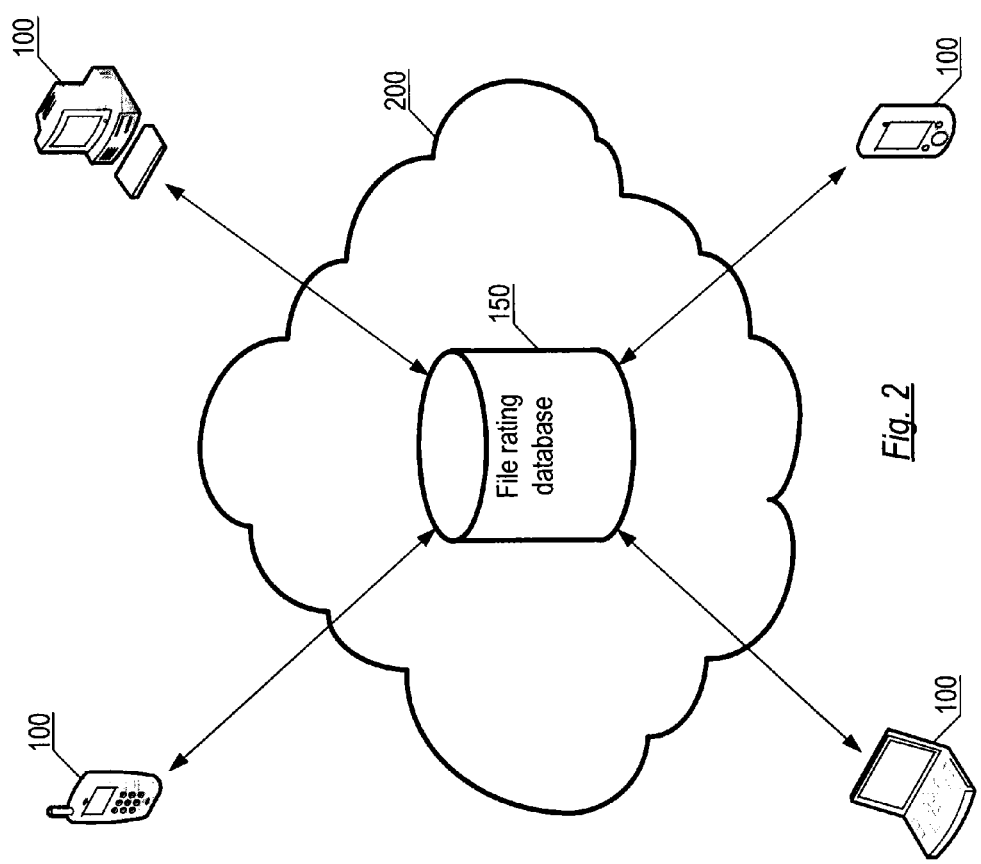
FIG. 2 is a diagram illustrating a particular embodiment of a file safety rating determination system according to one aspect of the invention.

FIG. 2 illustrates a specific embodiment of a file safety rating determination system. In this specific example, the file rating database 150 is common to multiple computer devices 100, on which file safety rating determination systems are installed. Therefore, the database 150 will store information on the files 111 contained on each of the computer devices 100. The safety rating of the files 111 in the database 150 can be changed by the event monitoring module 140 installed on each computer device 100, and can be used by the antivirus system 120 installed on each computer device 100 in order to detect malicious files.

This specific case is notable in that the malicious file can be detected and blocked by the antivirus system 120 on a certain computer device 100 even before suspicious actions are performed, due to the fact that the file's rating was previously lowered by the event monitoring module 140 used on another computer device 100. The above approach can be realized by installing a file rating database 150 in a cloud infrastructure 200 designed to be used by client computer devices 100.

In a related embodiment, a differential change to a file rating score is made based on the characteristics of the file itself. For example, the file type, or file size, or a combination thereof, may be considered. This approach stems from the fact that the malicious code is more likely to be encountered in certain types of files, or in files of a certain size. For instance, it is more likely that malicious code will be found in an executable file, than say, in an audio file. Similarly, statistically speaking, the size of malicious files tends to be less than 300 KB. In one such embodiment, if an un-registered file is launched, and the file is of an executable type, its safety rating is lowered (i.e., indicated as being more dangerous) by a relatively larger amount compared to an amount by which the rating is lowered for an unregistered launching of an audio file.

Figure 3:
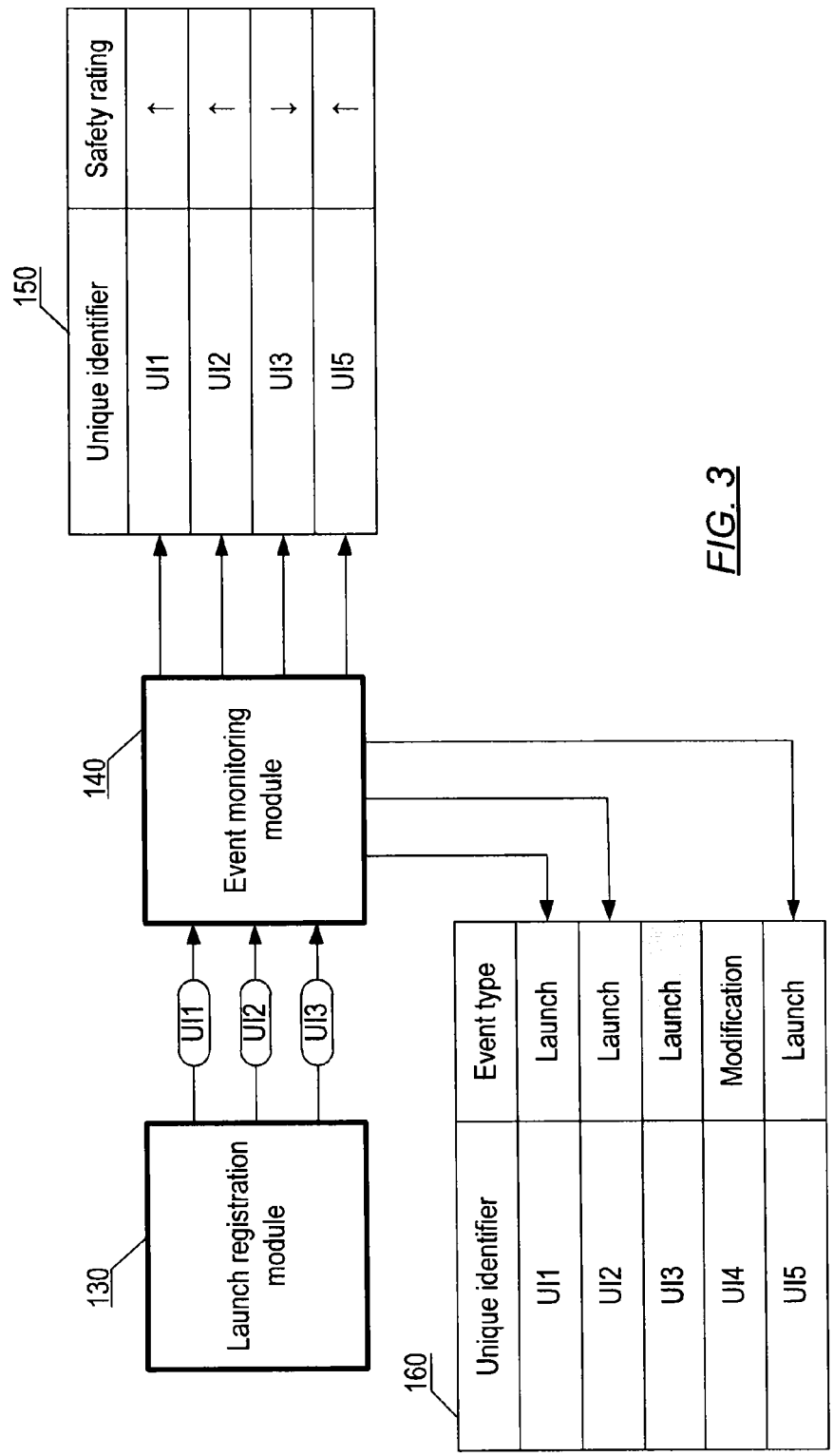
FIG. 3 is a block diagram illustrating interaction between a launch registration module, an event monitoring module, an event log, and a file rating database according to one embodiment.

FIG. 3 is a block diagram illustrating an example of interaction between the launch registration module 130, the event monitoring module 140, the event log 160 and the file rating database 150 according to one embodiment. Let's assume that the event log 160 contains information on the following events which happened in the operating system 110: information on the launches of files with unique identifiers "UI1", "UI2", "UI3", "UI5", and information on the modification of the file with the unique identifier "UI4". Let's also assume that the event monitoring module 140 receives information from the launch registration module 130 that the launches of the files with the unique identifiers "UI1", "UI2" and "UI5" were registered. By comparing the unique identifiers of the files from the information received from the launch registration module 130 with the identifiers of the launched files from the information stored in the event log 160, the event monitoring module 140 determines that the launch of the file with the identifier "UI3" was not registered. Based on this comparison, the event monitoring module 140 lowers the safety rating of the file with the identifier "UI3", the launch of which was not registered, in the file rating database 150. At the same time, the rating of the files with the identifiers "UI1", "UI2" and "UI5", the launch of which was registered, is raised by the event monitoring module 140.

Figure 4:
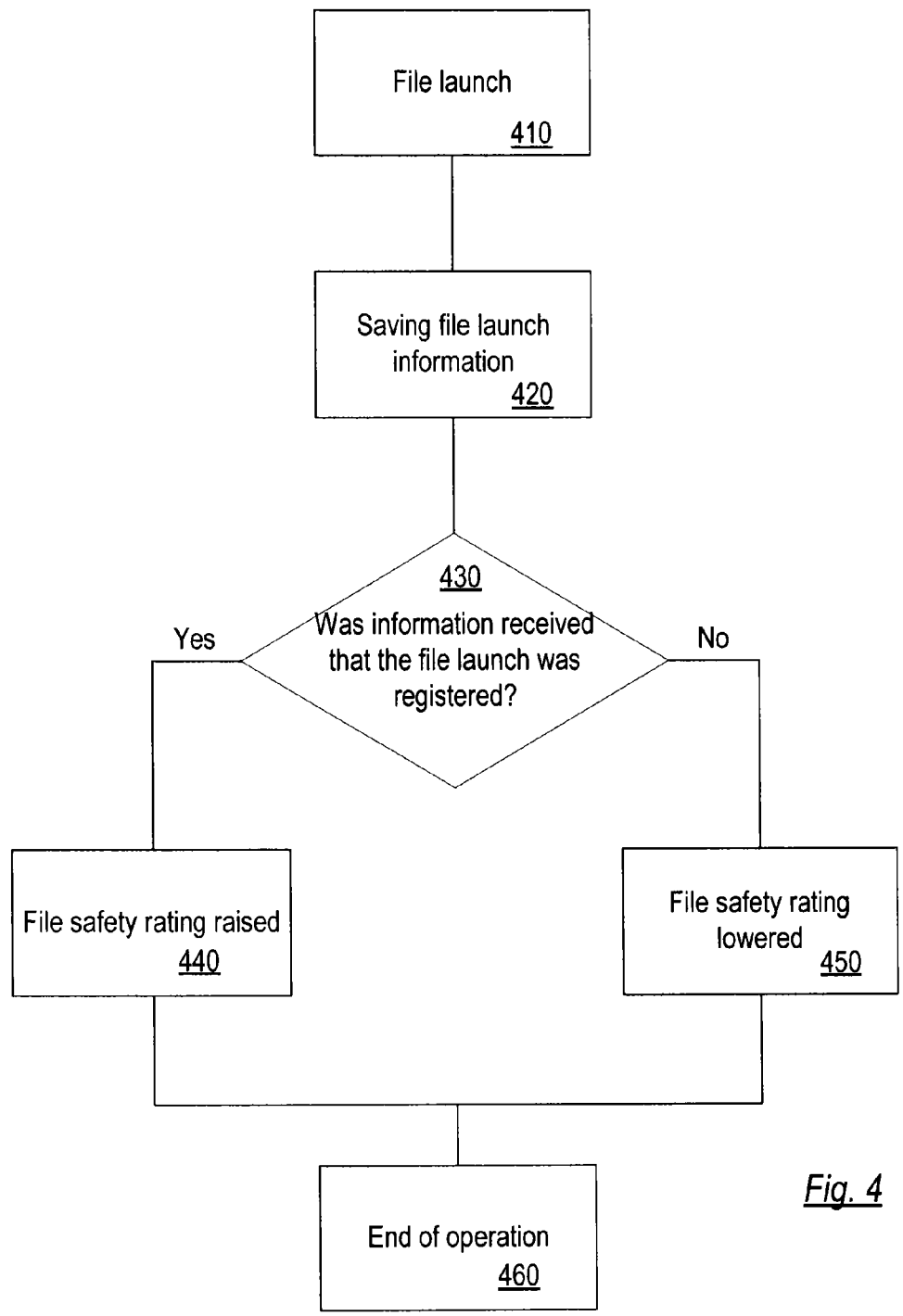
FIG. 4 is a flow diagram illustrating a process rating file safety according to one embodiment.

FIG. 4 is a flow diagram illustrating an exemplary process of file safety rating determination according to one embodiment. At 410, there is a launch of a file 111 in the operating system 110. At 420, the event monitoring module 140 saves the information on the file's launch in the event log 160, after which, at 430, it checks whether the information on the registration of the file's launch was received from the launch registration module 130. If such information was received, the event monitoring module 140, at 440, raises the safety rating of the file in the file rating database 150. If no such information was received, the event monitoring module 140, at 450, lowers the file safety rating in the file rating database 150. At 450, the file safety rating determination system ends its operation.

Figure 5:
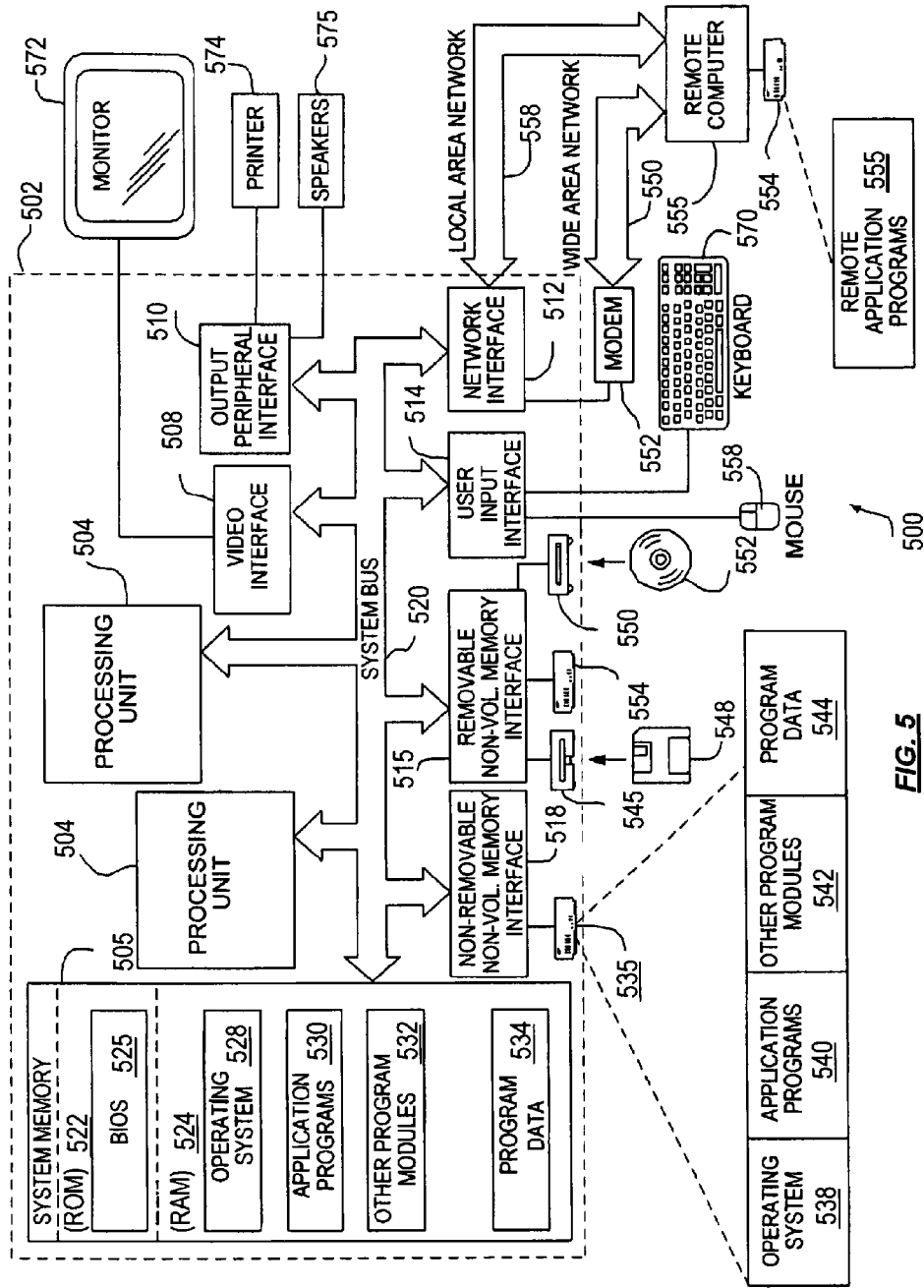
FIG. 5 is a block diagram depicting a general-purpose computer system on which aspects of the invention can be implemented.

FIG. 5 is a block diagram illustrating an exemplary general-purpose computer system on which one or more functional modules of the system can be implemented. Personal computer or server 520 contains a processor 521, system memory 522 and system bus 523, which contains various system components, including memory associated with processor 521. The system bus 523 is implemented as any known in bus structure, including a bus memory, bus memory controller, peripheral bus and local bus, which can interact with any other bus architecture. System memory includes read only memory (ROM) 524, and random access memory (RAM) 525. Basic input/output system (BIOS), containing the main procedures that ensure the transfer of information between the elements of the personal computer 520, for example, at boot time using the ROM 524.

The personal computer 520 contains a hard drive 527 for reading and writing, magnetic disk drive 528 for reading and writing to removable magnetic disk 529 and an optical drive 530 for reading and writing to removable optical disk 531, such as CD-ROM, DVD-ROM or other optical media. The hard disk drive 527, magnetic disk drive 528, optical drive 530 are all connected to the system bus 523 via the hard disk interface 532, magnetic disk drive interface 533 and an optical drive interface 534, respectively. Drives and the corresponding computer storage media are non-transitory, and non-volatile storage means of computer instructions, data structures, program modules and other data of a personal computer 520. This description reveals the implementation of a system, which uses a hard disk, removable magnetic disk 529 and a removable optical disk 531, but it should be understood that the use of other types of computer storage media that can store data in computer readable form (solid state disks, cassette tape, flash drive or other nonvolatile memory, digital disks, Bernoulli cartridges, random-access memory (RAM), read-only memories (ROM), etc.) is possible.

Some of the software modules, amongst which may be an operating system 535, are stored on a hard disk, magnetic disk 529, optical disk 531, ROM 524 or RAM 525. A computer 520 has a file system 536, which stores the operating system 535 and additional software applications 537, other program modules 538 and program data 539. The user has the ability to enter commands and information into a personal computer 520 through input devices (keyboard 540, Mouse 542). Other input devices may be (not shown): microphone, joystick, game console, satellite dish, scanner, etc. Such an input device are usually connected to the processor 521 through a serial port 546, which in turn is connected to the system bus, but may be connected by other means, such as a parallel port, game port or universal serial bus (USB). A monitor 547 or other type of display device is also connected to the system bus 523 via an interface such as a video adapter 548. In addition to the monitor 547, personal computer can be equipped with other peripheral output devices (not shown), such as speakers and printer, etc.

Personal computer 520 generally operates in a networked environment, using a logical connection to one or more remote computers 549. A remote computer (or computers) 549 is/are the same as personal computers, servers, routers, network stations, peering devices or another network host, and usually, have most or all of the elements previously described in the description of the substance of a personal computer 520, shown in FIG. 5, but only as a storage device 550 with applications 537. Logical connections include a local area network (LAN) 551 and wide area network (WAN) 552, such networks are common office equipment, and are also used in corporate computer networks, company intranets and the Internet.

When using LAN networks, a personal computer 520 is connected to LAN 551 via a network adapter or interface 553. When using the WAN networking, personal computer 520 has a modem 554 or other means of communication with the global computer network 552, such as the Internet. A modem 554, which may be internal or external, is connected to the system bus 523 via a serial port 546. In a networked environment software modules of exposed personal computers 520, or parts of such programs, are stored in remote storage devices. It should be pointed out that the network connections are merely illustrative and are not required to display the exact network configuration, network, i.e., in fact, there are other ways of establishing a logical connection, other technical means of communication of one computer to another.

It should be noted that aspects of the invention may be implemented using a computer system that is a subset of the general-purpose computer system described above. For instance, the computer system may be a blade server having a relatively limited set of input/output facilities. The computer system may also be implemented as an embedded system operating on a microcontroller digital signal processor, application-specific integrated circuit, field programmable gate array, or the like, provided that the system includes sufficient input/output facilities to enable it to interface with a subject computer system being managed or with other computing devices.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A security arrangement for assessing a risk level associated with launching acquired objects in an associated computer system, the security arrangement comprising:

computing hardware, including a processor, a data store, input/output facilities, and a user interface;

an operating system executable on the computing hardware, the operating system being adapted to facilitate launching of objects in the computer system;

an event monitoring module executable on the computing hardware and operatively coupled with the operating system, the event monitoring module configured to detect events occurring on the computer system including an event representing launching of a first object;

a launch registration module executable on the computing hardware and operatively coupled with the event monitoring module, the launch registration module configured to store an association of a detected launching of the first object with user input effecting that launching, if any;

a comparison module operatively coupled with the event monitoring module and the launch registration module, the comparison module configured to, determine, in response to a launching of the first object, whether an association exists between the launching, and any user input initiating that launching; and wherein the comparison module is further adapted to maintain a risk assessment record for the first object such that:

in response to the launching of the first object being associated with user input initiating that launching, the risk assessment record is updated to reduce an indicated risk level for the first object; and in response to the launching of the first object not being associated with any user input initiating that launching, the risk assessment record is updated to increase the indicated risk level for the first object.

2. The security arrangement of claim 1, wherein the risk assessment record is stored remotely from the computer system.

3. The security arrangement of claim 1, wherein the risk assessment record is stored in the computer system utilizing the computing hardware.

4. The security arrangement of claim 1, wherein the risk assessment record includes risk assessment information for a plurality of different objects based on associated launches of each of those objects on a plurality of distinct computer systems.

5. The security arrangement of claim 1, wherein the risk assessment record includes risk assessment information for the first object based on associated launches the first object on a plurality of distinct computer systems.

6. The security arrangement of claim 1, wherein in the stored association of the detected launching of the first object with user input effecting that launching, the first object is uniquely identified by its computer hash value.

7. The security arrangement of claim 1, wherein in the stored association of the detected launching of the first object with user input effecting that launching, the first object is uniquely identified by its full filename.

8. The security arrangement of claim 1, wherein the first object is a file.

9. The security arrangement of claim 1, wherein the first object is a document.

10. The security arrangement of claim 1, wherein the first object is a program.

11. The security arrangement of claim 1, wherein the first object is acquired via an attachment to a message.

12. The security arrangement of claim 1, wherein the first object is acquired via download from a remote computer system.

13. The security arrangement of claim 1, wherein the indicated risk level for the first object is indicated as at least one of: a category rating, and a numerical value; and wherein the risk assessment record is updated according to a predefined set of rules wherein increases in the risk level are made with greater increments than decreases in the risk level.

14. The security arrangement of claim 1, further comprising:

an antivirus module configured to perform a plurality of different security-related operations including heuristic analysis of objects for any presence of malware therein;

wherein the antivirus module is further configured to forgo the heuristic analysis of objects and to permit subsequent launching of those objects in response to a risk level associated with those object in the risk assessment record being below a predefined minimum risk threshold level.

15. The security arrangement of claim 1, further comprising:

an antivirus module configured to perform a plurality of different security-related operations including heuristic analysis of objects for any presence of malware therein;

wherein the antivirus module is further configured to forgo the heuristic analysis objects and to prevent subsequent launching of those objects in response to a risk level associated with those objects in the risk assessment record being above a predefined maximum risk threshold level.

16. The security arrangement of claim 1, wherein the comparison module is further adapted to adjust an amount by which the risk level is reduced or increased based on a characteristic of the first object selected from the group consisting of a file type, a file size, or any combination thereof.

17. In a computer system having computing hardware including a processor, a data store, and input/output facilities, a method for assessing a risk level associated with launching acquired objects on an associated computer system, the method being carried out automatically under program control by the computer system, the method comprising:

detecting events occurring on the computer system including an event representing launching of a first object;

storing an association of a detected launching of the first object with user input effecting that launching, if any;

determining, in response to a launching of the first object, whether an association exists between the launching, and any user input initiating that launching; and updating a risk assessment record for the first object such that:

in response to the launching of the first object being associated with user input initiating that launching, the risk assessment record is updated to reduce an indicated risk level for the first object; and in response to the launching of the first object not being associated with any user input initiating that launching, the risk assessment record is updated to increase the indicated risk level for the first object.

18. The method of claim 17, wherein the risk assessment record is stored remotely from the computer system.

19. The method of claim 17, wherein the risk assessment record is stored in the computer system utilizing the computing hardware.

20. The method of claim 17, wherein the risk assessment record includes risk assessment information for a plurality of different objects based on associated launches of each of those objects on a plurality of distinct computer systems.

21. The method of claim 17, wherein the risk assessment record includes risk assessment information for the first object based on associated launches the first object on a plurality of distinct computer systems.

22. The method of claim 17, wherein in the storing, the first object is uniquely identified by its computer hash value.

23. The method of claim 17, wherein in the storing, the first object is uniquely identified by its full filename.

24. The method of claim 17, wherein the first object is an object selected from the group consisting of: a file, a document, or a program.

25. The method of claim 17, further comprising:

acquiring the first object via an attachment to a message.

26. The method of claim 17, further comprising:
acquiring the first object via download from a remote computer system.

27. The method of claim 17, wherein the indicated risk level for the first object is indicated as at least one of: a category rating, and a numerical value, and
wherein the risk assessment record is updated according to a predefined set of rules wherein increases in the risk level are made with greater increments than decreases in the risk level.

28. The method of claim 17, further comprising:
performing a plurality of different security-related operations including heuristic analysis of objects for any presence of malware therein; and
forgoing the heuristic analysis of objects and permitting subsequent launching of those objects in response to a risk level associated with those object in the risk assessment record being below a predefined minimum risk threshold level.

29. The method of claim 17, further comprising:
performing a plurality of different security-related operations including heuristic analysis of objects for any presence of malware therein; and
forgoing the heuristic analysis objects and to prevent subsequent launching of those objects in response to a risk level associated with those objects in the risk assessment record being above a predefined maximum risk threshold level.

30. The method of claim 17, further comprising:
adjusting an amount by which the risk level is reduced or increased based on a characteristic of the first object selected from the group consisting of: a file type, a file size, or any combination thereof.

* * * * *